(12) United States Patent
Kang et al.

(10) Patent No.: US 9,835,903 B2
(45) Date of Patent: Dec. 5, 2017

(54) BACKLIGHT UNIT COMPRISING FIRST AND SECOND WHITE COLOR COORDINATES BELONGING TO DIFFERENT WHITE COLOR COORDINATE AREAS, DISPLAY DEVICE HAVING THE SAME, AND METHOD OF MANUFACTURING THE SAME

(71) Applicant: Samsung Display Co., Ltd., Yongin-si, Gyeonggi-Do (KR)

(72) Inventors: Eui Jeong Kang, Suwon-si (KR); Youra Kim, Seoul (KR); Hyun-Jeong Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 170 days.

(21) Appl. No.: 14/722,943

(22) Filed: May 27, 2015

(65) Prior Publication Data

US 2016/0124271 A1    May 5, 2016

(30) Foreign Application Priority Data

Nov. 5, 2014   (KR) .......................... 10-2014-0152581

(51) Int. Cl.
*G02F 1/1335*    (2006.01)

(52) U.S. Cl.
CPC .. *G02F 1/133621* (2013.01); *G02F 1/133602* (2013.01); *G02F 2001/133622* (2013.01)

(58) Field of Classification Search
CPC ... G02F 1/133621; G02F 2001/133622; G02F 1/133602
See application file for complete search history.

(56) References Cited

U.S. PATENT DOCUMENTS

| 7,772,603 | B2 | 8/2010 | Su et al. |
| 2009/0122230 | A1* | 5/2009 | Ochiai ................. G02B 6/0068 349/65 |
| 2009/0244084 | A1* | 10/2009 | Dammertz ............ G06T 11/001 345/586 |

(Continued)

FOREIGN PATENT DOCUMENTS

| KR | 10-2010-0006298 A | 1/2010 |
| KR | 1020110108705 A | 10/2011 |

(Continued)

*Primary Examiner* — Paul Lee
(74) *Attorney, Agent, or Firm* — H.C. Park & Associates, PLC

(57) ABSTRACT

A backlight unit that includes a light source driving substrate and first and second light source units connected to the light source driving substrate. The first light source unit includes first and second light sources respectively emitting a first light having a first color and a second light having a second color. The second light source unit may include third and fourth light sources respectively emitting a third light having the first color and a fourth light having the second color. The first light source unit emits a first white color light having a first white color coordinate by mixing the first light and the second light and the second light source unit emits a second white color light having a second white color coordinate by mixing the third light and the fourth light. The first and second white color coordinates belong to different white color coordinate areas.

19 Claims, 16 Drawing Sheets

(56) References Cited

U.S. PATENT DOCUMENTS

2010/0008071 A1* 1/2010 Kim .................. G02F 1/133603
362/97.3
2011/0205145 A1* 8/2011 Lin ...................... G02B 6/0068
345/102
2013/0163228 A1* 6/2013 Shin .......................... F21V 9/00
362/97.1

FOREIGN PATENT DOCUMENTS

| KR | 10-2013-0022720 A | 3/2013 |
| KR | 10-2013-0071806 A | 7/2013 |
| KR | 10-2013-0126396 A | 11/2013 |

* cited by examiner

FIG. 7

| Yellow Rank | Yellow Color Coordinate Area | Yellow luminous rank |
|---|---|---|
| First Yellow Rank(YR1) | A | YL1 |
| Second Yellow Rank(YR2) | A | YL2 |
| Third Yellow Rank(YR3) | A | YL3 |
| Fourth Yellow Rank(YR4) | B | YL1 |
| Fifth Yellow Rank(YR5) | B | YL2 |
| Sixth Yellow Rank(YR6) | B | YL3 |
| Seventh Yellow Rank(YR7) | C | YL1 |
| Eighth Yellow Rank(YR8) | C | YL2 |
| Ninth Yellow Rank(YR9) | C | YL3 |
| Tenth Yellow Rank(YR10) | D | YL1 |
| Eleventh Yellow Rank(YR11) | D | YL2 |
| Twelfth Yellow Rank(YR12) | D | YL3 |
| Thirteenth Yellow Rank(YR13) | E | YL1 |
| Fourteenth Yellow Rank(YR14) | E | YL2 |
| Fifteenth Yellow Rank(YR15) | E | YL3 |

FIG. 9

| Blue Rank | Blue Color Coordinate Rank | Blue Rank |
|---|---|---|
| First Blue Rank | X | BL1 |
| Second Blue Rank | X | BL2 |
| Third Blue Rank | X | BL3 |
| Fourth Blue Rank | Y | BL1 |
| Fifth Blue Rank | Y | BL2 |
| Sixth Blue Rank | Y | BL3 |
| Seventh Blue Rank | Z | BL1 |
| Eighth Blue Rank | Z | BL2 |
| Ninth Blue Rank | Z | BL3 |

BACKLIGHT UNIT COMPRISING FIRST AND SECOND WHITE COLOR COORDINATES BELONGING TO DIFFERENT WHITE COLOR COORDINATE AREAS, DISPLAY DEVICE HAVING THE SAME, AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on 5 Nov. 2014 and there duly assigned Serial No. 10-2014-0152581.

BACKGROUND OF THE INVENTION

Field of Disclosure

The present disclosure relates to a backlight unit having improved yield, a display device having the same, and a method of manufacturing the same.

Description of the Related Art

As one of flat panel display devices, a liquid crystal display device is widely used in various electric devices, such as a television set, a monitor, a notebook computer, a mobile phone, etc., to display an image.

The liquid crystal display device controls an intensity of electric field applied to liquid crystal interposed between two substrates and controls an amount of light passing through the two substrates, thereby displaying a desired image. The liquid crystal display device includes a liquid crystal display panel to display the image and a backlight unit to provide the light to the liquid crystal display panel.

The backlight unit is classified into an edge-illumination type backlight unit and a direct-illumination type backlight unit according to a position of a light source thereof. The edge-illumination type backlight unit includes a light guide plate and the light source disposed adjacent to a side surface of the light guide plate, and the direct-illumination type backlight unit includes a diffusion plate and the light source disposed under the light source.

The above information disclosed in this Related Art section is only for enhancement of understanding of the background of the invention and therefore it may contain information that does not form the prior art that is already known to a person of ordinary skill in the art.

SUMMARY OF THE INVENTION

Exemplary embodiments of the present inventive concept provide for a backlight unit having improved yield.

Exemplary embodiments of the present inventive concept provide for a display device having the backlight unit.

Exemplary embodiments of the present inventive concept provide for a method of manufacturing the backlight unit.

In an exemplary embodiment of the inventive concept provides for a backlight unit including a light source driving substrate, a first light source unit connected to the light source driving substrate, and a second light source unit connected to the light source driving substrate. The first light source unit includes a first light source emitting a first light having a first color and a second light source emitting a second light having a second color. The second light source unit includes a third light source emitting a third light having the first color and a fourth light source emitting a fourth light having the second color. The first light source unit emits a first white color light having a first white color coordinate, which is obtained by mixing the first light and the second light, and the second light source unit emits a second white color light having a second white color coordinate, which is obtained by mixing the third light and the fourth light. The first and second white color coordinates belong to different white color coordinate areas.

The first and third light sources belong to different first ranks among first ranks classified in accordance with a color coordinate and a luminous intensity.

The second and fourth light sources belong to different second ranks among second ranks classified in accordance with a color coordinate and a luminous intensity.

The first and second light source units are alternately arranged with each other.

The backlight unit further includes a third light source unit connected to the light source driving substrate. The third light source unit includes a fifth light source emitting a fifth light having the first color and a sixth light source emitting a sixth light having the second color. The third light source unit emits a third white color light having a third white color coordinate, which is obtained by mixing the fifth and sixth lights, and the first, second, and third white color coordinates belong to different color coordinate areas.

The third white color coordinate belongs to substantially the same color coordinate as an average color coordinate of the first and second white color coordinates.

In another exemplary embodiment of the inventive concept provides for a display device including a display panel displaying an image and a backlight unit providing a light to the display panel. The backlight unit includes a light source driving substrate, a first light source unit connected to the light source driving substrate, and a second light source unit connected to the light source driving substrate. The first light source unit includes a first light source emitting a first light having a first color and a second light source emitting a second light having a second color. The second light source unit includes a third light source emitting a third light having the first color and a fourth light source emitting a fourth light having the second color. The first light source unit emits a first white color light having a first white color coordinate, which is obtained by mixing the first light and the second light, and the second light source unit emits a second white color light having a second white color coordinate, which is obtained by mixing the third light and the fourth light. The first and second white color coordinates belong to different color coordinate areas.

The first color is a yellow color and the second color is a blue color.

The backlight unit is operated in a time division scheme in synchronization with a first field and a second field, which are obtained by timely dividing a frame. The first and third light sources respectively emit the first and third lights during the first field, and the second and fourth light sources respectively emit the second and fourth lights during the second field.

The display panel includes a first pixel including a first color filter having a third color, a second pixel including a second color filter having a fourth color, and a third pixel including a transmission part.

The first color is obtained by mixing the third and fourth colors.

In another exemplary embodiment of the inventive concept provides for a method of manufacturing a backlight unit, including combining first color light sources emitting a light having a first color with second color light sources emitting a light having a second color to form light source units, determining a color coordinate of the light source units, classifying the light source units into at least two white ranks in accordance with the color coordinate of each of the light source units, and arranging the light source units on a light source driving substrate to allow the light source units belonging to different white ranks to be alternately arranged with each other.

The method further includes classifying the first color light sources to first ranks in accordance with a luminous intensity and a color coordinate and classifying the second color light sources to second ranks in accordance with a luminous intensity and a color coordinate. The forming of the light source units includes combining the first and second light sources according to a combination of the first and second ranks.

The color coordinate of the light source units is determined with reference to a combination table, and the combination table includes information about white color coordinates according to the combination of the first ranks and the second ranks.

The color coordinate of the light source units is determined by comparing information about the first and second ranks of the first and second color light sources, which respectively belong to the light source units, with the combination table.

The at least two white ranks include a first white rank and a second white rank. First light source units belonging to the first white rank among the light source units emit a first white color light having a first white color coordinate, and second light source units belonging to the second white rank among the light source units emit a second white color light having a second white color coordinate. The first and second white color coordinates belong to different color coordinate areas.

The two white ranks further include a third white rank. Third light source units belonging to the third white rank among the light source units emit a third white color light having a third white color coordinate, and the third white color coordinate belongs to a color coordinate area different from the first and second white color coordinates.

The third color coordinate belongs to substantially the same color coordinate area as an average color coordinate of the first and second white color coordinates.

The first, second, and third light source units are alternately arranged with each other.

According to the above, the backlight unit uses the light sources belonging to various ranks, and thus the yield of the backlight unit is improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 7 is a table showing a yellow rank according to an exemplary embodiment of the present disclosure;

FIG. 9 is a table showing a blue rank according to an exemplary embodiment of the present disclosure;

DETAILED DESCRIPTION

Figure 1:
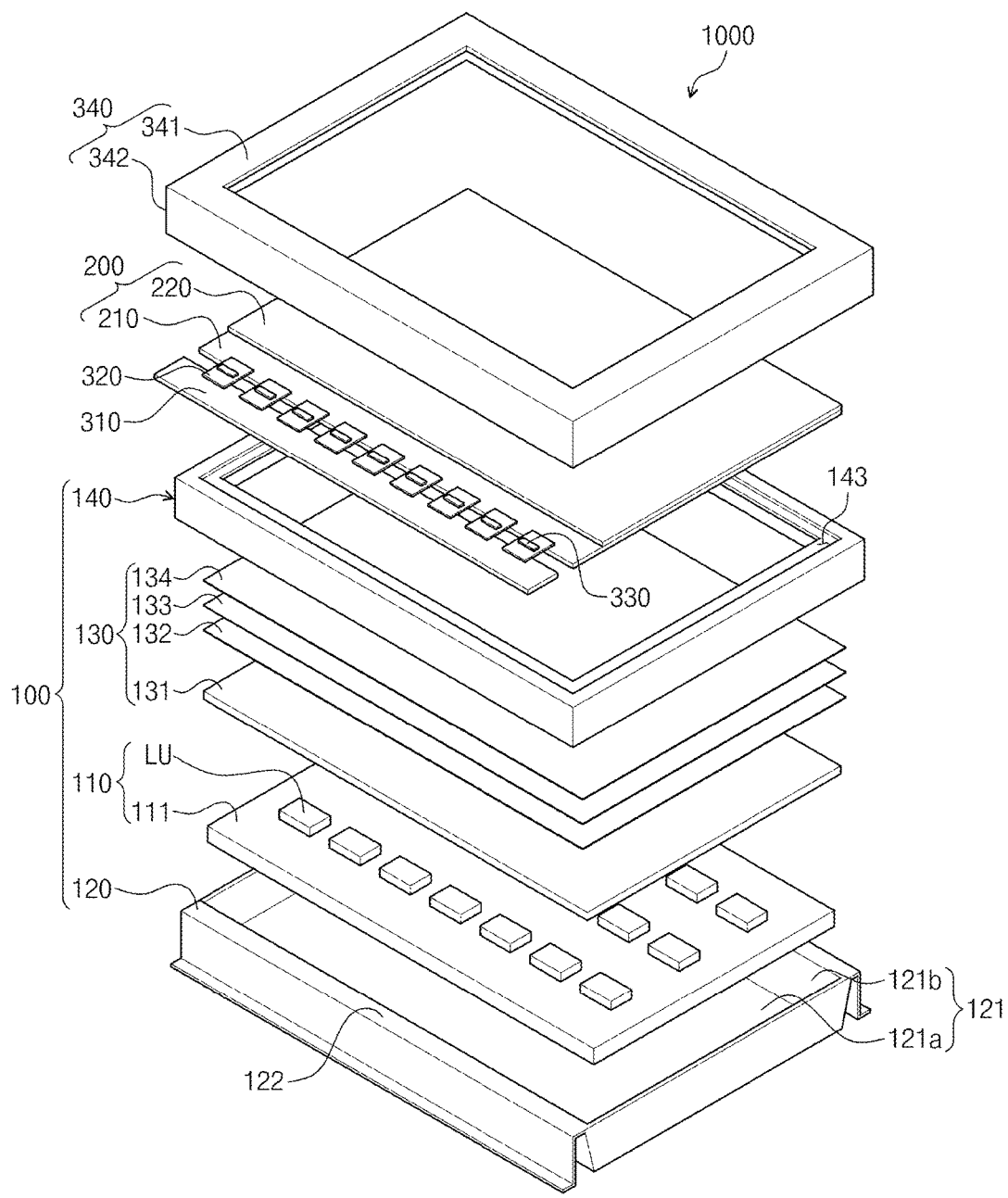
FIG. 1 is an exploded perspective view showing a display device according to an exemplary embodiment of the present disclosure.

The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "include", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a display device 1000 according to an exemplary embodiment of the present disclosure.

Referring to FIG. 1, the display device 1000 may include a backlight unit 100 to generate a light and a display panel 200 receiving the light to display an image.

The display panel 200 may include an array substrate 210, an opposite substrate 220 coupled to the array substrate 210 to face the array substrate 210, and a liquid crystal layer (not shown) interposed between the array substrate 210 and the opposite substrate 220.

The array substrate 210 is a thin film transistor (TFT) substrate in which thin film transistors serving as switching device are arranged in a matrix form. Source and gate terminals of each thin film transistor are respectively connected to a corresponding data line of data lines and a corresponding gate line of gate lines and a drain terminal of each thin film transistor is connected to a pixel electrode formed of a transparent conductive material.

The opposite substrate 220 may include a color filter to display a color, a black matrix, and a common electrode formed of a transparent conductive material.

The display device 1000 may include a printed circuit board 310 to apply a control signal to the display panel 200 and a driving circuit film 320 to connect the printed circuit board 310 to the display panel 200.

The driving circuit film 320 is a tape carrier package (TCP) or a chip-on-film (COF), on which a driving chip 330 is mounted.

The driving chip 330 may include a data driver DD (refer to FIG. 10) to apply data signals to the data lines of the display panel 200 and a gate driver GD (refer to FIG. 10) to apply gate signals to the gate lines of the display panel 200. The gate driver GD may be directly formed on the display panel 200 through a thin film process.

The backlight unit 100 may include a light source assembly 110, an accommodating member 120, an optical member 130, and a frame member 140.

The accommodating member 120 may include an accommodating part 121 to accommodate the light source assembly 110 and a supporting part 122 to support the optical member 130. The accommodating member 121 may include a bottom surface 121a and a sidewall 121b extending from the bottom surface 121a, and the bottom surface 121a has a substantially quadrangular shape. The sidewall 121b extends from an edge of the bottom surface 121a to provide an accommodating space in which the backlight unit 100 is accommodated. The accommodating member 120 is formed of an aluminum-based metal to effectively discharge heat generated from the backlight unit 100 and have superior strength.

The optical member 130 may include a diffusion plate 131 and an optical sheet 132, 133, and 134.

The diffusion plate 131 has a plate-like shape. The diffusion plate 131 is disposed on the light source assembly 110 and diffuses the light emitted from the light source assembly 110 to improve brightness uniformity. The diffusion plate 131 supports the optical sheet 132, 133, and 134 to prevent the optical sheet 132, 133, and 134 from sagging.

The optical sheet 132, 133, and 134 may include at least one sheet to improve brightness characteristics of the light exiting from the diffusion plate 131. For instance, the optical sheet 132, 133, and 134 include one diffusion sheet 132 to diffuse the light and two prism sheets 133 and 134 to condense the light.

The diffusion sheet 132 is disposed on the diffusion plate 131 to diffuse the light exiting from the diffusion plate 131. The diffusion sheet 132 may include a transparent material, e.g., polyethylene terephthalate (PET).

The prism sheets 131 and 134 are disposed on the diffusion sheet 132 and condense the light diffused by the diffusion sheet 132 to improve front brightness. Each of the prism sheet 133 and 134 may include a prism pattern (not shown) having a prism shape. In particular, the prism sheets 133 and 134 have prism patterns extending in different directions.

The backlight unit 100 may include the frame member 140 disposed between the optical member 130 and the display panel 200. The frame member 140 is coupled to the accommodating member 120 to fix the optical member 130 to the accommodating member 120 and to prevent the optical member 130 from moving.

The frame member 140 supports the display panel 200. In detail, the frame member 140 further may include a panel guide part 143 to guide the display panel 200 placed thereon.

The display device 1000 further may include a top chassis 340 coupled to the frame member 140 to fix the display panel 200 to the frame member 140. The top chassis 340 may include a top cover 341 and a side cover 342. The top cover 341 is provided with an opening formed therethrough to correspond to a display area (not shown) of the display panel 200. The side cover 342 extends downward from the top cover 342.

The top chassis 340 surrounds an edge of the display panel 200. The top chassis 340 fixes the display panel 200 to the panel guide part 143. The top chassis 340 prevents the display panel 200 from being damaged due to external impacts and from being separated from the panel guide part 143 of the frame member 140.

The light source assembly 110 may include a light source driving substrate 111 and a plurality of light source units LU connected to the light source driving substrate 111. The light source driving substrate 111 is accommodated in the accommodating part 121 of the accommodating member 120 to face the optical member 130. The light source units LU are arranged on the light source driving substrate 111 in a matrix form.

As an example, the light source driving substrate 111 has a substantially plate-like shape corresponding to that of the bottom surface 121a, but the shape of the light source driving substrate 111 should not be limited to the plate-like shape. That is, the light source driving substrate 111 may have a bar shape extending in one direction. In this case, the light source driving substrate 111 having the bar shape is provided in a plural number and the light source driving substrates 111 are arranged in a direction substantially perpendicular to the one direction. The light source units LU are arranged in each light source driving substrate 111 in one line shape.

The light source units LU disposed on the light source driving substrate 111 provide the light to the optical member 130.

Although not shown in FIG. 1, the backlight unit 100 may further include a reflective sheet. The reflective sheet reflects the light leaked downward from the light source assembly 110 to the optical member 130 to improve light utilization efficiency. As an example, the reflective sheet may be formed of polyethylene terephthalate or polycarbonate.

Figure 2:
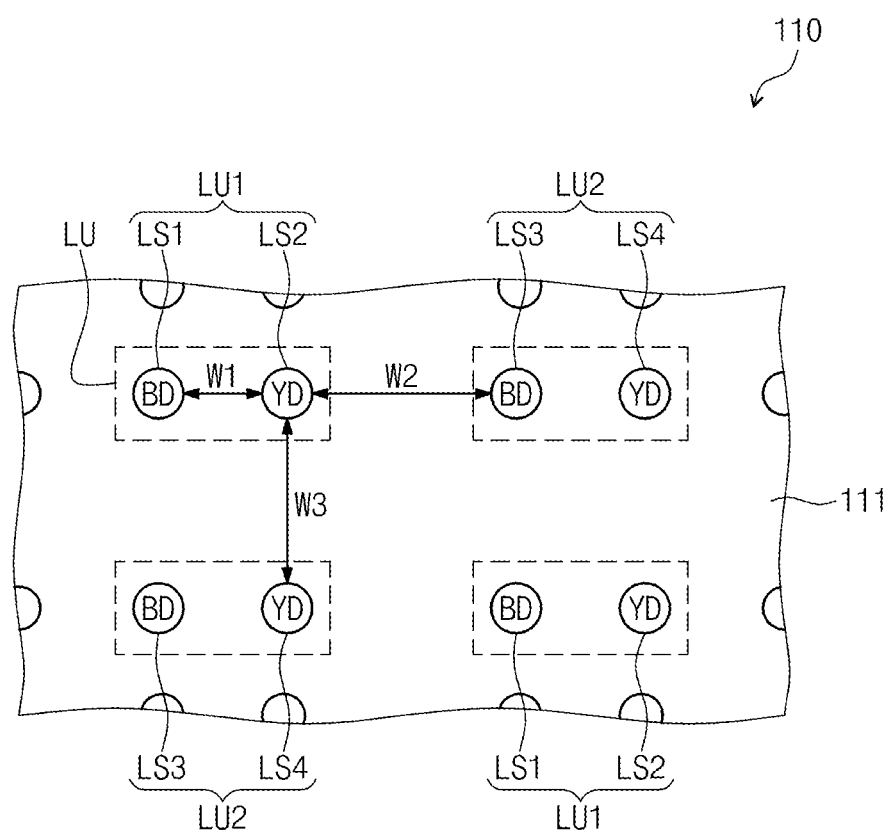
FIG. 2 is an enlarged plan view showing a portion of a light source assembly shown in FIG. 1.
Figure 3:
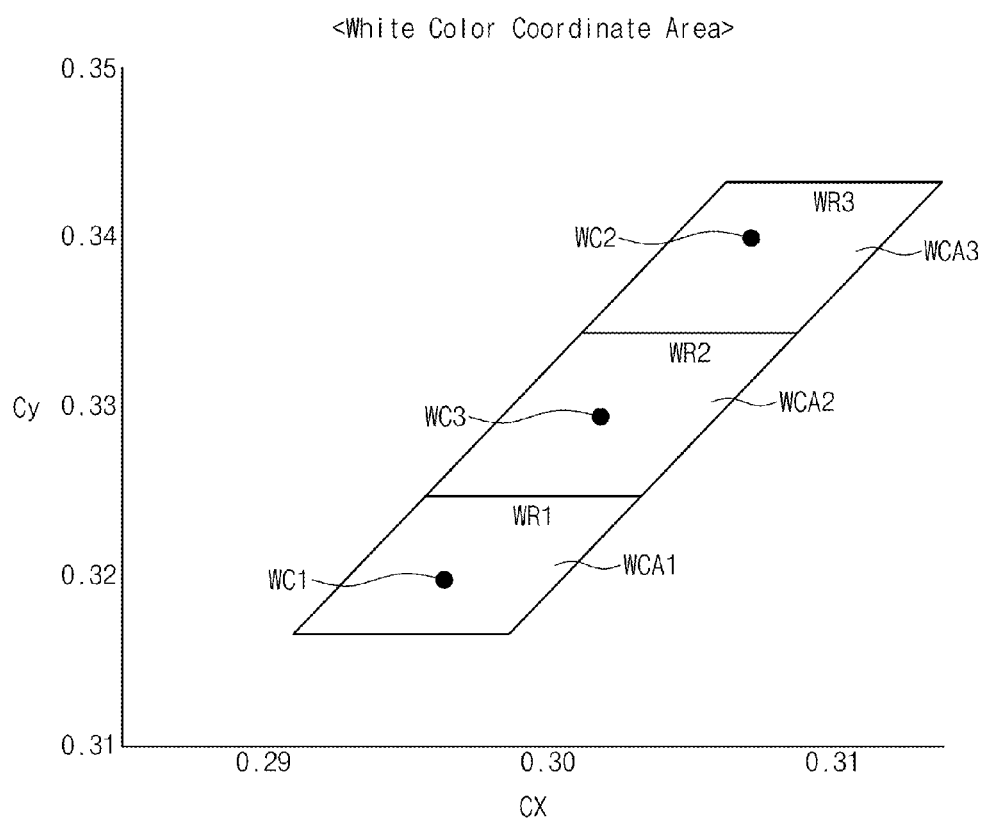
FIG. 3 is a view showing white color coordinate in a CIE color coordinate system according to an exemplary embodiment of the present disclosure.

FIG. 2 is an enlarged plan view showing a portion of the light source assembly 110 shown in FIG. 1 and FIG. 3 is a view showing white color coordinate in a CIE color coordinate system according to an exemplary embodiment of the present disclosure.

Referring to FIG. 2, the light source units LU are arranged in the matrix form. For the convenience of explanation, FIG. 2 shows only a portion of the light source units LU (refer to FIG. 1).

The light source unit LU may include a first light source unit LU1 and a second light source unit LU2. The first and second light source units LU1 and LU2 are alternately arranged with each other in row and column directions.

The first light source unit LU1 may include a first light source LS1 and a second light source LS2. The first light source LS1 emits a first light having a first color and the second light source LS2 emits a second light having a second color different from the first color.

As an example, the first and second colors complement each other. For instance, a mixed color of the first and second colors is a white color.

In the present exemplary embodiment, the first color is a blue color and the second color is a yellow color. That is, the first and second lights are blue and yellow lights, respectively, but they should not be limited thereto or thereby. That is, each of the first and second colors may be one of red, green, magenta, and cyan colors.

The second light source unit LU2 may include a third light source LS3 and a fourth light source LS4. The third light source LS3 emits a third light having the first color and the fourth light source LS4 emits a fourth light having the second color.

The first and second light sources LS1 and LS2 of the first light source unit LU1 are spaced apart from each other in the row direction by a first width W1. The third and fourth light sources LS3 and LS4 of the second light source unit LU4 are spaced apart from each other in the row direction by the first width W1.

The first and second light source units LU1 and LU2 are spaced apart from each other by a second width W2 in the row direction and by a third width W3 in the column direction. The second width W2 corresponds to a width between the light sources closest to each other in the row direction among the light sources of the first and second light sources LU1 and LU2. In addition, the third width W3 corresponds to a width between the light sources closest to each other in the column direction among the light sources of the first and second light sources LU1 and LU2.

The first to fourth light sources LS1 to LS4 include light emitting diodes. Each light emitting diode may include a light emitting chip, a fluorescent substance coated to cover the light emitting chip, and a lens part covering the light emitting chip and the fluorescent substance. As an example, each of the first and third light sources LS1 and LS3 may include a blue light emitting diode BD and each of the second and fourth light sources LS2 and LS4 may include a yellow light emitting diode YD.

The first light source unit LU1 emits a first white color light having a first white color coordinate WC1. In more detail, when the first and second light sources LS1 and LS2 are turned on, the first light emitted from the first light source LS1 is mixed with the second light emitted from the second light source LS2 to form the first white color light. In addition, the second light source unit LU2 emits a first white color light having a second white color coordinate WC2 different from the first white color coordinate WC1. In more detail, when the third and fourth light sources LS3 and LS4 are turned on, the third light emitted from the third light source LS3 is mixed with the fourth light emitted from the fourth light source LS4 to form the second white color light.

Referring to FIG. 3, the white color coordinate is defined in an area on a CIE color coordinate system corresponding to the white color and classified into first, second, and third white color coordinate areas WCA1, WCA2, and WCA3. The second white color coordinate area WCA2 is defined between the first and third white color coordinate areas WCA1 and WCA3.

As an example, the first white color coordinate WC1 belongs to the first white color coordinate area WCA1. In this case, the first light source unit LU1 is classified as a first white rank WR1. The second white color coordinate WC2 belongs to the third white color coordinate area WCA3. In this case, the second light source unit LU2 is classified as a third white rank WR3.

As described above, the first and second white color lights of the first and second light source units LU1 and LU2 belong to different white color coordinates spaced apart from each other such that a white color coordinate is disposed therebetween, but they should not be limited thereto or thereby.

Figure 4:
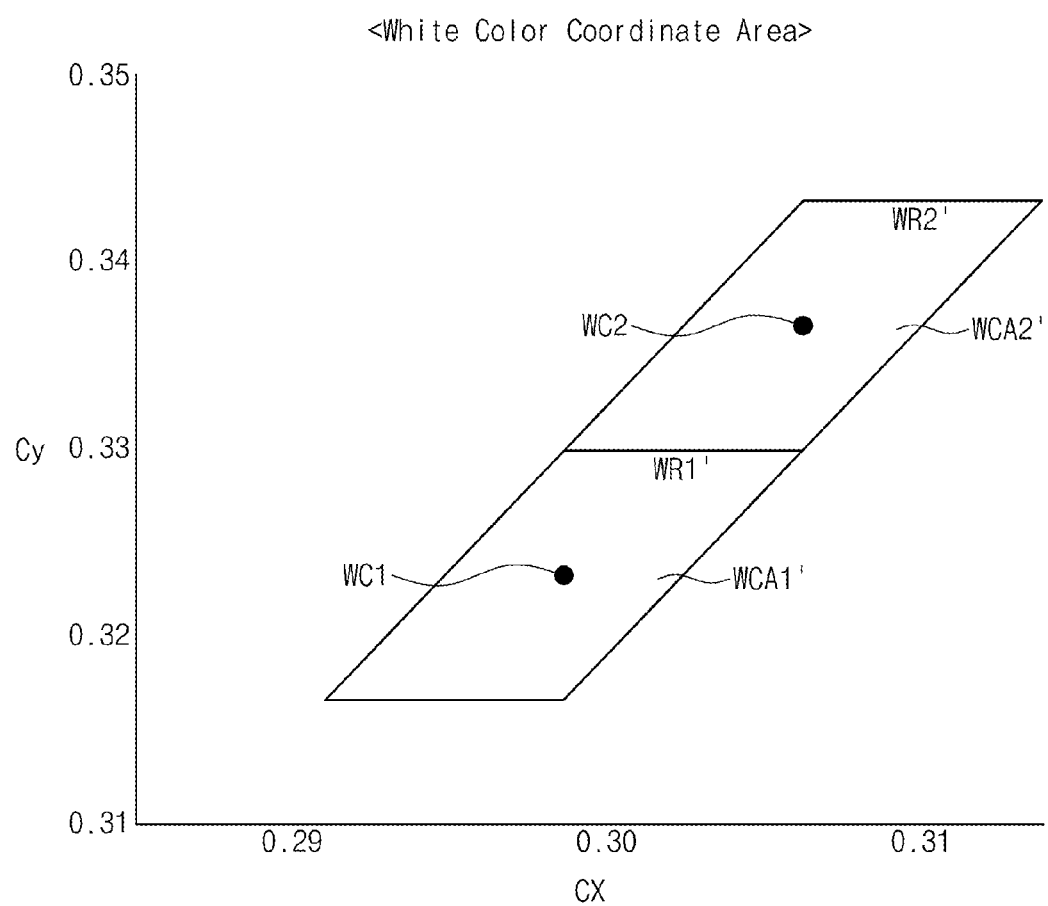
FIG. 4 is a view showing white color coordinate in a CIE color coordinate system according to another exemplary embodiment of the present disclosure.

FIG. 4 is a view showing white color coordinate in a CIE color coordinate system according to another exemplary embodiment of the present disclosure. As another example, the first and second white lights of the first and second light source units LU1 and LU2 respectively belong to two white color coordinate areas adjacent to each other. In more detail, as shown in FIG. 4, the white color coordinate area is divided into first and second white color coordinate areas WCA1' and WCA2' adjacent to each other, the first white color coordinate WC1 belongs to the first white color coordinate area WCA1', and the second white color coordinate WC2 belongs to the second white color coordinate area WCA2'. In this case, the first and second light source units LU1 and LU2 belong to the first and second white ranks WR1' and WR2', respectively.

Figure 5:
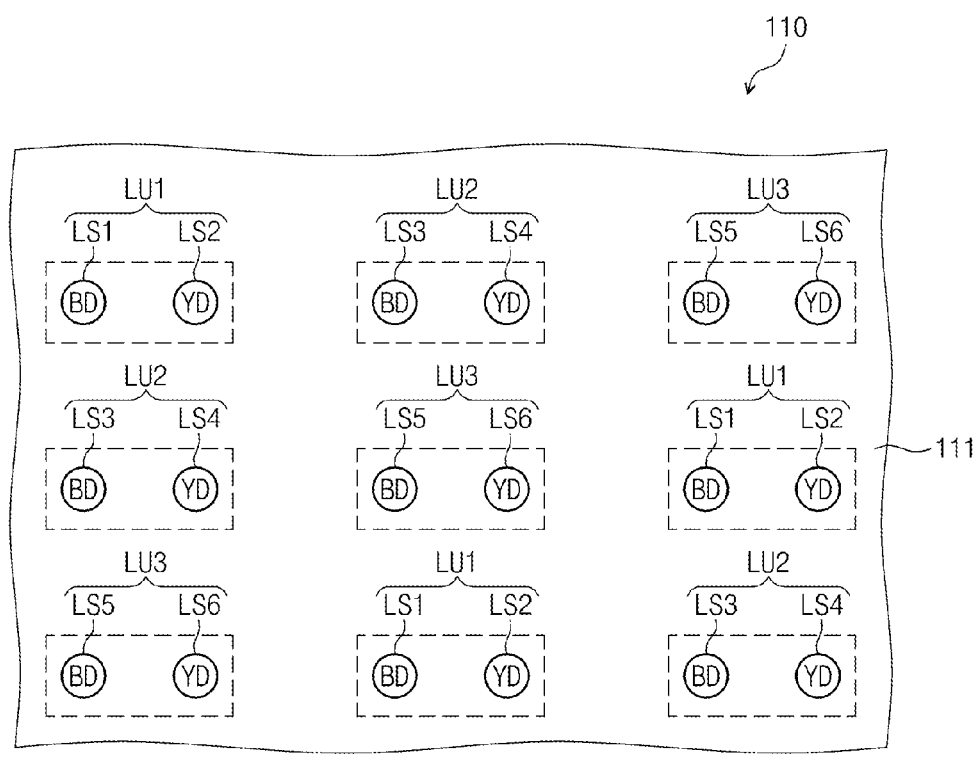
FIG. 5 is an enlarged plan view showing a portion of a light source assembly according to another exemplary embodiment of the present disclosure.

FIG. 5 is an enlarged plan view showing a portion of a light source assembly according to another exemplary embodiment of the present disclosure.

Referring to FIGS. 3 and 5, the light source unit LU may further include a third light source unit LU3. The first to third light source units LU1 to LU3 are alternately arranged with each other in the row and column directions. Accordingly, the first light source units LU1 are not disposed adjacent to each other in the row and column directions, the second light source units LU2 are not disposed adjacent to each other in the row and column directions, and the third light source units LU3 are not disposed adjacent to each other in the row and column directions.

The third light source unit LU3 may include a fifth light source LS5 and a sixth light source LS6. The fifth light source LS5 emits a fifth light having the first color and the sixth light source LS6 emits a sixth light having the second color. As an example, the fifth light source LS5 may include the blue light emitting diode BD and the sixth light source LS6 may include the yellow light emitting diode YD.

The third light source LU3 emits a third white color light having a third white color coordinate WC3 different from the first and second white color coordinates. In more detail, when the fifth and sixth light sources LS5 and LS6 are turned on, the fifth light emitted from the fifth light source LS5 is mixed with the sixth light emitted from the sixth light source LS6 to form the third white color light.

The third white color coordinate WC3 may belong to the same color coordinate area as an average color coordinate of the first and second white color coordinates WC1 and WC2. For instance, the third color coordinate WC3 belongs to the second white color coordinate area WCA2. In this case, the third light source unit LU3 is classified as a second white rank WR2.

As described above, since the first and second light source units LU1 and LU2 having different white color coordinates from each other are alternately arranged with each other, the light source assembly 110 provides an output white color light having uniform white color coordinate to an entire surface of the diffusion plate 131 (refer to FIG. 1). The output white color light is obtained by mixing the first and second white color lights with each other. The white color coordinate of the output white color light corresponds to the average color coordinate of the first and second white color coordinates WC1 and WC2. For instance, the first and second white color coordinates WC1 and WC2 respectively belong to the first and third white color coordinate areas WCA1 and WCA3, the average color coordinate may belong to the second white color coordinate WCA2.

In this case, the first to third widths W1 to W3 are determined to allow the first and second white color lights to be properly mixed with each other. That is, the first to third widths W1 to W3 are determined such that a difference in white color coordinate between the first and second white color lights is not perceived. For instance, the first width W1 is set to be smaller than the second and third widths W2 and W3.

Meanwhile, since the first white color light is realized by mixing the first light (blue light) and the second light (yellow light), the first white color coordinate WC1 of the first white color light is determined by the color coordinate and luminous intensity of each of the first and second lights. Similarly, since the second white color light is realized by mixing the third light (blue light) and the fourth light (yellow light), the second white color coordinate WC2 of the second white color light is determined by the color coordinate and luminous intensity of each of the third and fourth lights. Hereinafter, the first to fourth light sources LS1 to LS4 respectively emitting the first to fourth lights will be described in detail.

The light emitting diodes emitting the lights having the same color may be classified into different ranks according to the color coordinate of the light emitted from each light emitting diode and the luminous intensity.

According to Table 1 below, the yellow light emitting diode is classified into first, second, and third yellow luminous intensity ranks YL1, YL2, and YL3 in accordance with the luminous intensity. For instance, when the luminous intensity of the light emitted from the yellow light emitting diode is about 4300 cd, the yellow light emitting diode is classified as a first yellow luminous intensity rank YL1.

TABLE 1

| Yellow luminous intensity rank | Minimum value of luminous intensity [cd] | Maximum value of luminous intensity [cd] |
| --- | --- | --- |
| YL1 | 4000 | 4400 |
| YL2 | 4400 | 4800 |
| YL3 | 4800 | 5200 |

Figure 6:
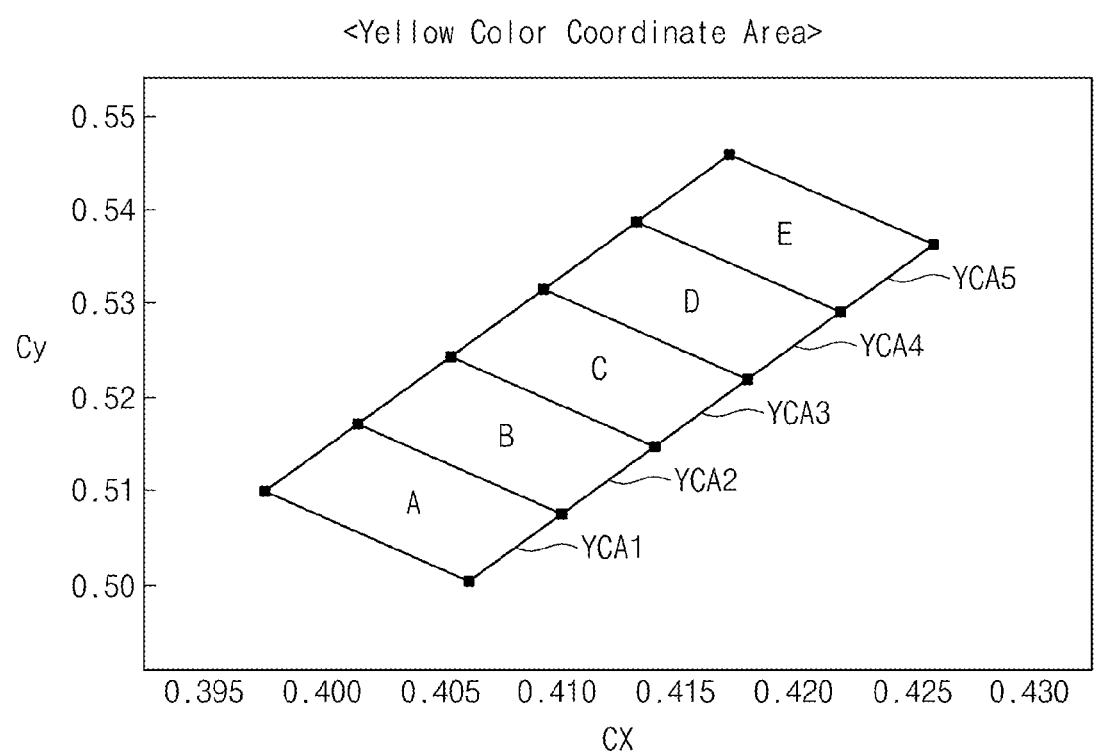
FIG. 6 is a view showing yellow color coordinate in a CIE color coordinate system according to an exemplary embodiment of the present disclosure.

FIG. 6 is a view showing yellow color coordinate in a CIE color coordinate system according to an exemplary embodiment of the present disclosure.

Referring to FIG. 6, the yellow color coordinate area is defined in an area on the CIE color coordinate system corresponding to the yellow color and classified into first to fifth yellow color coordinate area YCA1 to YCA5.

The yellow light emitting diode YD (refer to FIG. 2) is classified into first to fifth yellow color coordinate ranks A to E. The first to fifth yellow color coordinate ranks A to E correspond to the first to fifth yellow color coordinate areas YCA1 to YCA5, respectively. In more detail, the yellow light emitting diode YD is classified as one of the first to fifth yellow color coordinate ranks A to E according to the color coordinate area to which the color coordinate of the yellow light emitted from the yellow light emitting diode YD belongs. For instance, when the color coordinate of the light emitted from the yellow light emitting diode is (0.41, 0.516), the yellow light emitting diode is classified as the second yellow color coordinate rank B.

In the present exemplary embodiment, the number of the yellow color coordinate ranks should not be limited to five. In addition, the number of the yellow luminous intensity ranks should not be limited to three.

FIG. 7 is a table showing a yellow rank according to an exemplary embodiment of the present disclosure.

Referring to FIG. 7, the yellow light emitting diode YD (refer to FIG. 2) is classified into a plurality of yellow ranks according to a combination of the yellow color coordinate ranks and the yellow luminous intensity ranks. As an example, the yellow light emitting diode is classified into first to fifteenth yellow ranks YR1 to YR15. As an example, when the color coordinate of the light emitted from a specific yellow light emitting diode is (0.41, 0.156) and the luminous intensity is about 4300 cd to belong to the second yellow color coordinate rank B and the second yellow luminous intensity rank YL2, the specific yellow light emitting diode is classified as the fifth yellow rank YR5.

According to Table 2 below, the blue light emitting diode BD (refer to FIG. 2) is classified into first, second, and third blue luminous intensity ranks BL1, BL2, and BL3 in accordance with the luminous intensity. For instance, when the luminous intensity of the light emitted from the blue light emitting diode is about 2700 cd, the blue light emitting diode is classified as a second blue luminous intensity rank BL2.

TABLE 2

| Blue luminous intensity rank | Minimum value of luminous intensity [cd] | Maximum value of luminous intensity [cd] |
| --- | --- | --- |
| BL1 | 2400 | 2600 |
| BL2 | 2600 | 2800 |
| BL3 | 2800 | 3200 |

Figure 8:
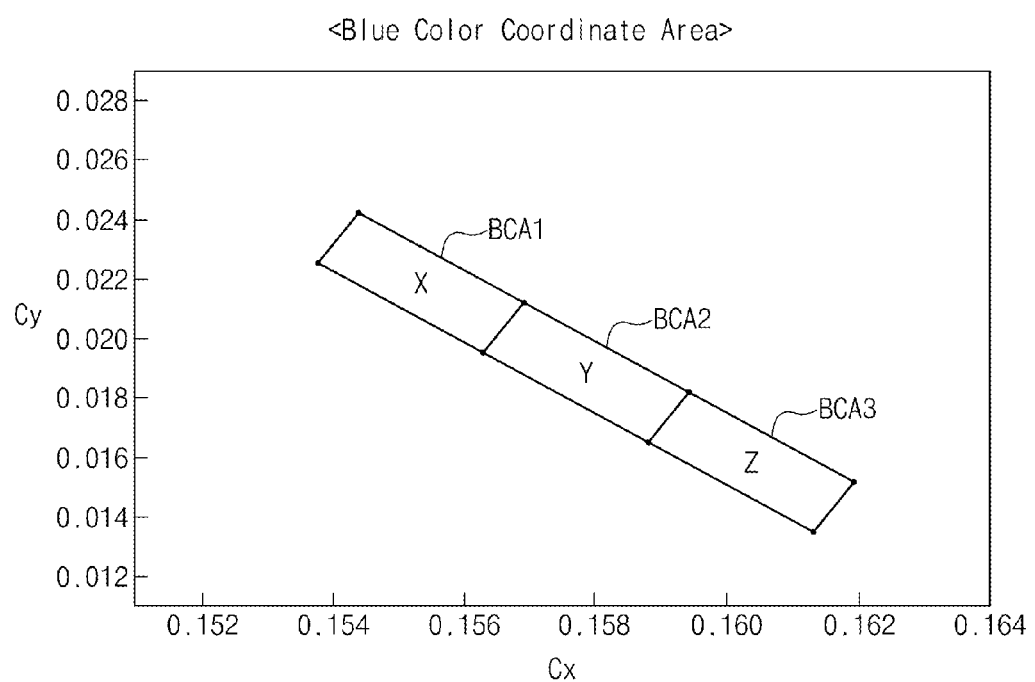
FIG. 8 is a view showing blue color coordinate in a CIE color coordinate system according to an exemplary embodiment of the present disclosure.

FIG. 8 is a view showing blue color coordinate in a CIE color coordinate system according to an exemplary embodiment of the present disclosure.

Referring to FIG. 8, the blue color coordinate area is defined in an area on the CIE color coordinate system corresponding to the blue color and classified into first to third blue color coordinate area BCA1 to BCA3.

The blue light emitting diode BD is classified into first to third blue color coordinate ranks X to Z. The first to third blue color coordinate ranks X to Z correspond to the first to third blue color coordinate areas BCA1 to BCA3, respectively. In more detail, the blue light emitting diode BD is classified as one of the first to third blue color coordinate ranks X to Z according to the color coordinate area to which the color coordinate of the blue light emitted from the blue light emitting diode BD belongs. For instance, when the color coordinate of the light emitted from the blue light emitting diode is (0.157, 0.019), the blue light emitting diode is classified as the second blue color coordinate rank Y.

FIG. 9 is a table showing a blue rank according to an exemplary embodiment of the present disclosure.

Referring to FIG. 9, the blue light emitting diode BD (refer to FIG. 2) is classified into a plurality of blue ranks according to a combination of the blue color coordinate ranks and the blue luminous intensity ranks. As an example, the blue light emitting diode is classified into first to ninth blue ranks BR1 to BR9. As an example, when the color coordinate of the light emitted from a specific blue light emitting diode is (0.157, 0.018) and the luminous intensity is about 2700 cd to belong to the second blue color coordinate rank Y and the second blue luminous intensity rank BL2, the specific blue light emitting diode is classified as the fifth blue rank BR5.

In the present exemplary embodiment, the number of the blue color coordinate ranks should not be limited to three and the number of the blue luminous intensity ranks should not be limited to three.

Referring to FIG. 2 again, the first and third light sources LS1 and LS3 belong to different blue ranks from each other among the blue ranks BR1 to BR9. For instance, the first light source LS1 belongs to the ninth blue rank BR9 and the second light source LS2 belongs to the fourth blue rank BR4. In addition, the second and fourth light source LS2 and LS4 belong to different yellow ranks from each other among the yellow ranks YR1 to YR15. For instance, the second light source LS2 belongs to the first yellow rank YR1 and the fourth light source LS4 belongs to the fifth yellow rank YR5.

As another embodiment, the first and third light sources LS1 and LS3 may belong to the same rank and the second and fourth light sources LS2 and LS4 may belong to different yellow ranks among the yellow ranks. On the contrary, the second and fourth light sources LS2 and LS4 may belong to the same yellow rank and the first and third light sources LS1 and LS3 may belong to different blue ranks among the blue ranks BR1 to BR9.

As described above, the combination of the first and second light sources LS1 and LS2 and the combination of the third and fourth light sources LS3 and LS4 may be determined to allow the first and second light source units LU1 and LU2 to belong to different white ranks from each other.

According to the above, since the first and second light source units LU1 and LU2 are alternately arranged with each other, the light source assembly 110 provides the white color light having uniform white color coordinate. In addition, since the first and second light source units LU1 and LU2 use the blue light emitting diode BD and the yellow light emitting diode YD, which belong to various ranks, a yield of the backlight unit 100 is improved, thereby reducing a manufacturing cost of the backlight unit.

Figure 10:
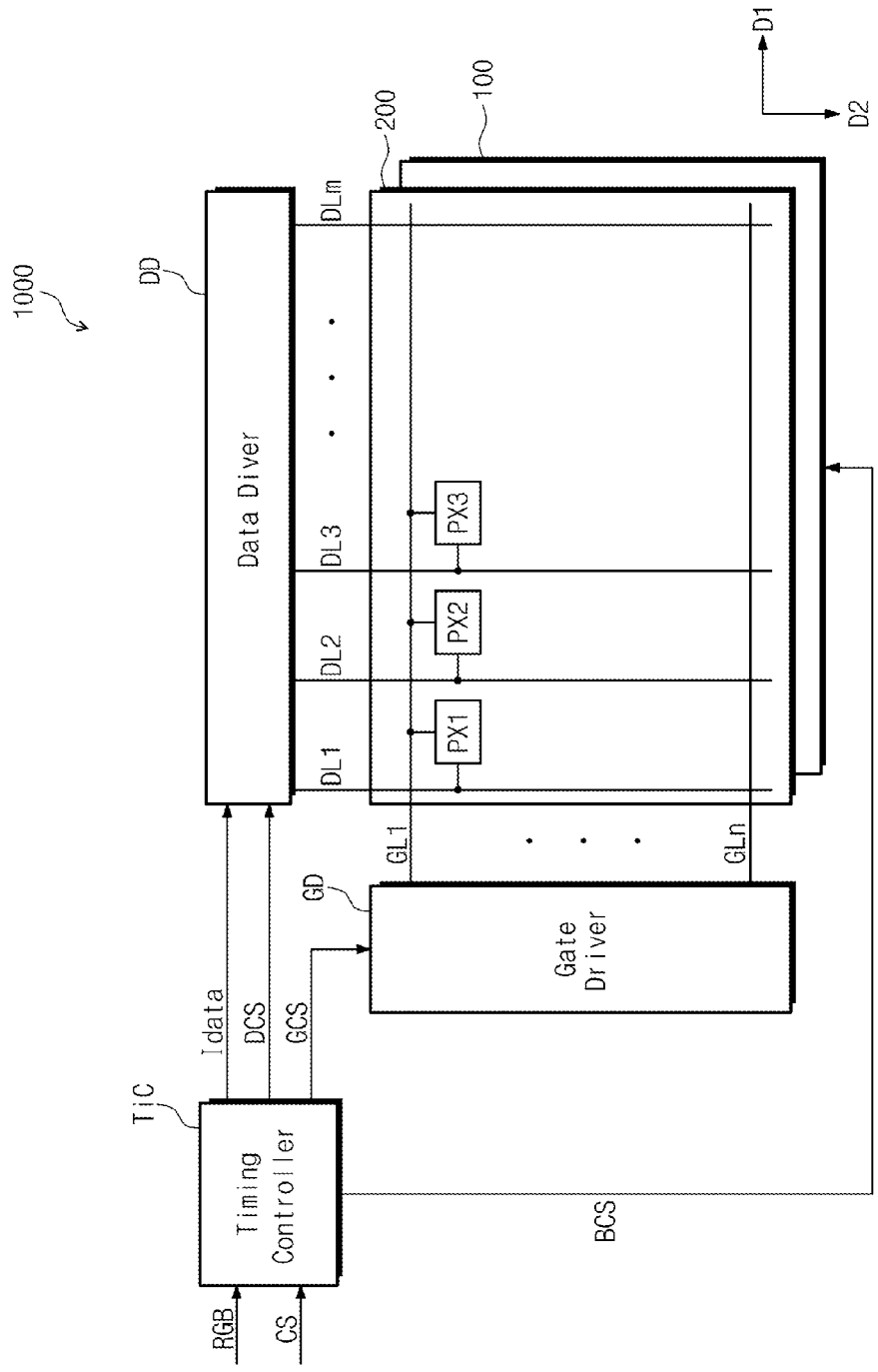
FIG. 10 is a block diagram showing a display device according to an exemplary embodiment of the present disclosure.

FIG. 10 is a block diagram showing a display device 1000 according to an exemplary embodiment of the present disclosure.

Referring to FIG. 10, the display device 1000 may include the display panel 200 to display an image, gate and data drivers GD and DD to drive the display panel 200, and a timing controller TiC to control a drive of the gate and data drivers GD and DD.

The timing controller TiC receives image information RGB and a plurality of control signals CS from an external source (not shown) provided outside of the display device 1000. The timing controller TiC converts a data format of the image information RGB to a data format appropriate to an interface between the data driver DD and the timing controller TiC to generate image data Idata and applies the image data Idata to the data driver DD.

The timing controller TiC generates a data control signal DCS, e.g., an output start signal, a horizontal start signal, etc., and a gate control signal GCS, e.g., a vertical start signal, a vertical clock signal, a vertical clock bar signal, etc., on the basis of the control signals CS. The data control signal DCS is applied to the data driver DD and the gate control signal GCS is applied to the gate driver GD.

The gate driver GD sequentially outputs gate signals in response to the gate control signal GCS provided from the timing controller TiC.

The data driver DD converts the image data Idata to data voltages in response to the data control signal DCS provided from the timing controller 100. The data voltages output from the data driver DD are applied to the display panel 200.

The display panel 200 may include a plurality of gate lines GL1 to GLn, a plurality of data lines DL1 to DLm, and a plurality of pixels.

The gate lines GL1 to GLn extend in a first direction D1 and are arranged in a second direction D2 substantially perpendicular to the first direction D1 to be substantially parallel to each other. The gate lines GL1 to GLn are connected to the gate driver GD to receive the gate signals from the gate driver GD.

The data lines DL1 to DLm extend in the second direction D2 and are arranged in the first direction D1 to be substantially parallel to each other. The data lines DL1 to DLm are connected to the data driver DD to receive the data voltages from the data driver DD.

The pixels are configured to include first, second, and third pixels PX1, PX2, and PX3, which display different colors. The first to third pixels PX1 to PX3 are sequentially arranged in the first direction D1 and spaced apart from one another. Each of the first to third pixels PX1 to PX3 may include a thin film transistor (not shown) and a liquid crystal capacitor (not shown)

Each of the first to third pixels PX1 to PX3 is connected to a corresponding gate line of the gate lines GL1 to GLn and a corresponding data line of the data lines DL1 to DLm and independently operated.

In more detail, the first pixel PX1 is connected to the first gate line GL1 and the first data line DL1. The first pixel PX1 is turned on in response to the gate signal applied thereto through the first gate line GL1, and the turned-on first pixel PX1 displays the image having a grayscale level corresponding to the data voltage applied thereto through the first data line DL1.

The second pixel PX2 is connected to the first gate line GL1 and the second data line DL2. The second pixel PX2 is turned on in response to the gate signal applied thereto through the first gate line GL1, and the turned-on second pixel PX2 displays the image having a grayscale level corresponding to the data voltage applied thereto through the second data line DL2.

The third pixel PX3 is connected to the first gate line GL1 and the third data line DL3. The third pixel PX3 is turned on in response to the gate signal applied thereto through the first gate line GL1, and the turned-on third pixel PX3 displays the image having a grayscale level corresponding to the data voltage applied thereto through the third data line DL3.

The timing controller TiC applies a backlight control signal BCS to the backlight unit 100. The backlight unit 100 generates the light in response to the backlight control signal BCS and provides the light to the display panel 200.

Figure 11:
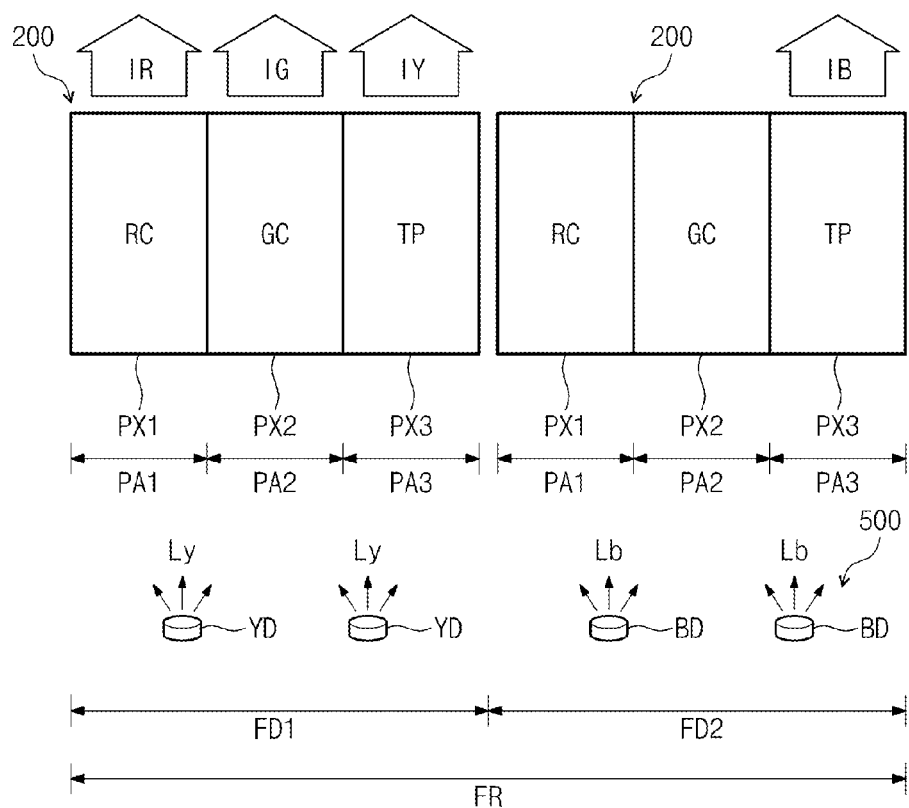
FIG. 11 is a view showing a principle of realizing a full color image in accordance with a space division scheme and a time division scheme.

FIG. 11 is a view showing a principle of realizing a full color image in accordance with a space division scheme and a time division scheme.

Hereinafter, areas respectively corresponding to the first, second, and third pixels PX1, PX2, and PX3 are referred to as first, second, and third pixel areas PA1, PA2, and PA3, respectively. In this case, first and second colors are respectively disposed in the first and second pixel areas PA1 and PA2 and a transmission part TP is disposed in the third pixel area PA3.

The backlight unit 100 may include the blue light emitting diode BD and the yellow light emitting diode YD. As described above, the blue light emitting diode may be the first and third light sources LS1 and LS3 and the yellow light emitting diode YD may be the second and fourth light sources LS2 and LS4.

A frame FR is divided into first and second fields FD1 and FD2. The yellow light emitting diode YD is operated in the first field FD1 and a yellow color light Ly emitted from the backlight unit 100 is provided to the display panel 200. Then, the blue light emitting diode BD is operated in the second field FD2 and a blue color light Lb emitted from the backlight unit 100 is provided to the display panel 200.

Accordingly, a red color light component of the yellow color light Ly emitted from the yellow light emitting diode YD during the first field FD1 passes through a red color filter RC and is displayed as a red image IR, and a green color light component of the yellow color light Ly emitted from the yellow light emitting diode YD during the first filed FD1 passes through a green color filter GC and is displayed as a green image IG. In addition, the yellow color light Ly passes through the transmission part TP and is displayed as a yellow image IY.

Then, the blue color light Lb emitted from the blue light emitting diode BD during the second field FD2 passes through the transmission part TP and is displayed as a blue image IB. However, since the blue color light Lb does not pass through the first and second color filters R and G, no image is displayed in the first and second pixel areas PA1 and PA2.

As described above, the yellow image IY is displayed during the first field FD1 by the transmission part TP and the blue image IB is displayed during the second field FD2 by the transmission part TP. Since the transmission part TP does not include a color filter, the yellow and blue color lights Ly and Lb pass through the transmission part TP without light loss. Therefore, the light utilization efficiency of the display device 1000 (refer to FIG. 10) is improved.

Figure 12:
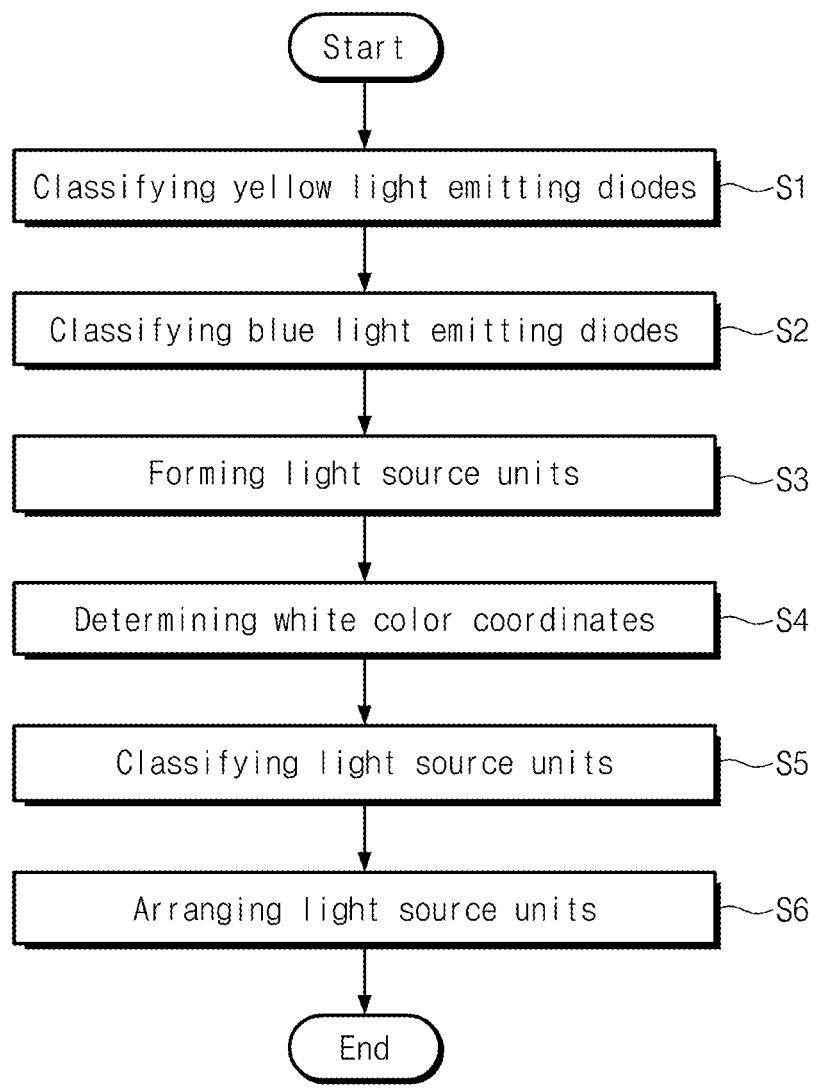
FIG. 12 is a flowchart showing a method of manufacturing a display device according to an exemplary embodiment of the present disclosure.
Figure 13:
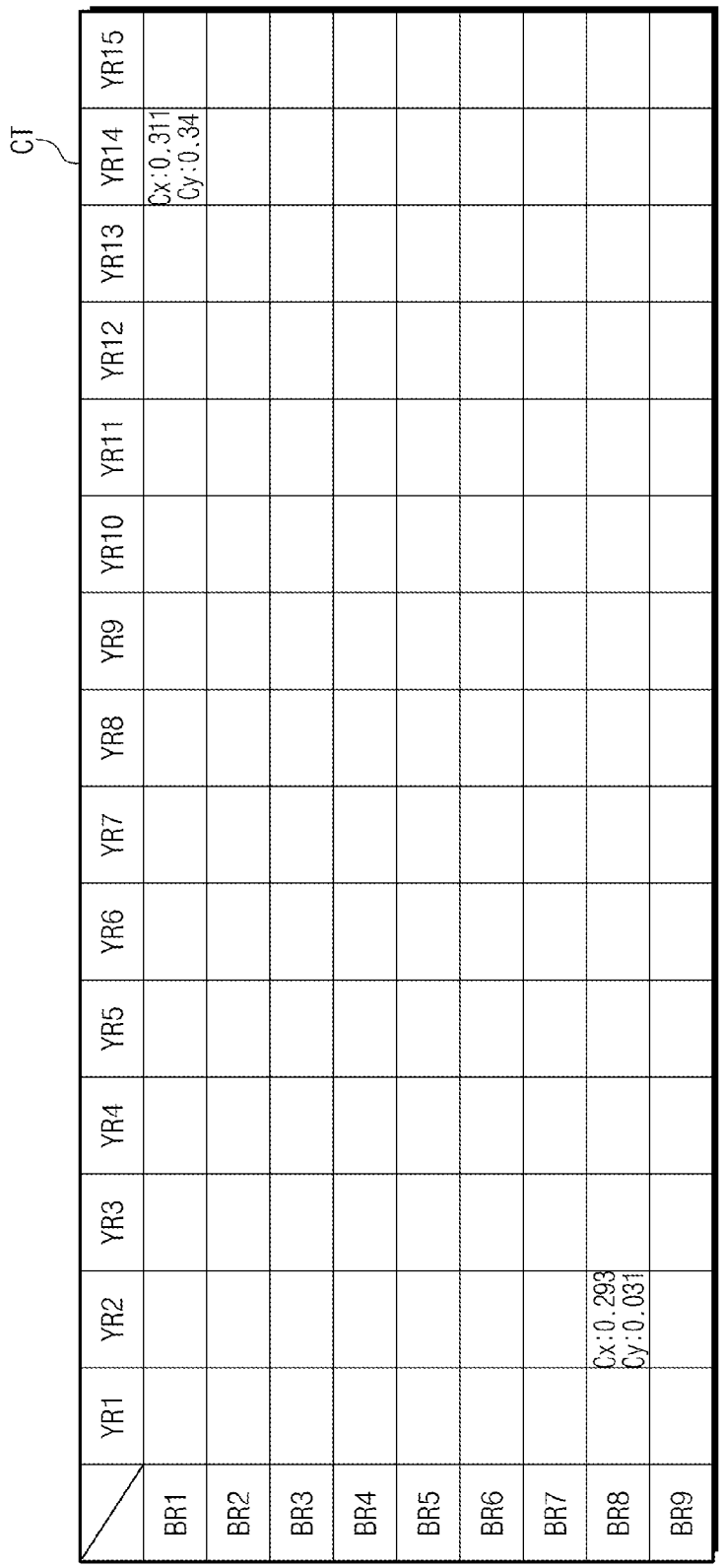
FIG. 13 is a view showing a combination table according to an exemplary embodiment of the present disclosure.

FIG. 12 is a flowchart showing a method of manufacturing a display device according to an exemplary embodiment of the present disclosure and FIG. 13 is a view showing a combination table CT according to an exemplary embodiment of the present disclosure.

Referring to FIG. 12, the yellow light emitting diodes are classified into different yellow ranks from each other (S1). In more detail, optical characteristics of the yellow light emitting diodes are not the same and are scattered. In this case, the yellow light emitting diodes are classified into different yellow ranks according to the luminous intensity and the color coordinate. As described with reference to FIG. 7, the yellow light emitting diodes are classified into the first to fifteenth yellow ranks YR1 to YR15 in accordance with the combination of the yellow color coordinate rank and the yellow luminous rank.

The blue light emitting diodes are classified into different blue ranks from each other (S2). In more detail, optical characteristics of the blue light emitting diodes are not the same and are scattered. In this case, the blue light emitting diodes are classified into different blue ranks according to the luminous intensity and the color coordinate. As described with reference to FIG. 9, the blue light emitting diodes are classified into the first to ninth blue ranks BR1 to BR9 in accordance with the combination of the blue color coordinate rank and the blue luminous rank.

The order of the classification of the blue light emitting diodes (S2) and the classification of the yellow light emitting diodes (S1) should not be limited to a specific order.

Then, the yellow light emitting diodes and the blue light emitting diodes are combined with each other to form the light source units (S3). Each of the light source units may include one yellow light emitting diode and one blue light emitting diode.

As an example, the yellow and blue light emitting diodes are combined with each other in accordance with the combination of the blue ranks and the yellow ranks. In the present exemplary embodiment, the yellow light emitting diodes are classified into the first to fifteenth yellow ranks YR1 to YR15 and the blue light emitting diodes are classified into the first to ninth blue ranks BR1 to BR9. Accordingly, the yellow and blue light emitting diodes may be classified into 135 (15×9=135) combinations different from each other.

The color coordinates of the light source units are determined (S4). As an example, the color coordinates of the light source units are determined with reference to the combination table CT shown in FIG. 13. The combination table CT may include information about the white color coordinates according to the combination of the blue ranks BR1 to BR9 and the yellow ranks YR1 to YR15. The combination table CT has rows corresponding to the first to ninth blue ranks BR1 to BR9 and columns corresponding to the first to fifteenth yellow ranks YR1 to YR15.

The white color coordinate according to the combination of the blue rank and the yellow rank is displayed in each cell of the combination table CT. Values (white color coordinates) of the cells of the combination table CT may be predetermined by previously measuring the color coordinate of the white color light in accordance with the combinations of the blue ranks BR1 to BR9 and the yellow ranks YR1 to YR15. That is, the values in the cells may be determined by an experiment previously carried out.

The color coordinates of the light source units are determined by comparing the information about the blue and yellow ranks of the blue and yellow light emitting diodes with the combination table.

For instance, when a specific light source unit is formed by combination of the blue and yellow light emitting diodes respectively classified into the eighth blue rank BR8 and the second yellow rank YR2, the white color coordinate of the specific light source is determined to have 0.293 (Cx) and 0.031 (Cy) with reference to the value of the combination table CT in the cell of the eighth row and the second column, which correspond to the eighth blue rank BR8 and the second yellow rank YR2.

Similarly, when a specific light source unit is formed by combination of the blue and yellow light emitting diodes respectively classified into the first blue rank BR1 and the fourteenth yellow rank YR14, the white color coordinate of the specific light source is determined to have 0.311 (Cx) and 0.34 (Cy) with reference to the value of the combination table CT in the cell of the first row and the fourteenth column, which correspond to the first blue rank BR1 and the fourteenth yellow rank YR14.

For the convenience of explanation, FIG. 13 shows only the values corresponding to a portion of the cells of the combination table CT.

Figure 14:
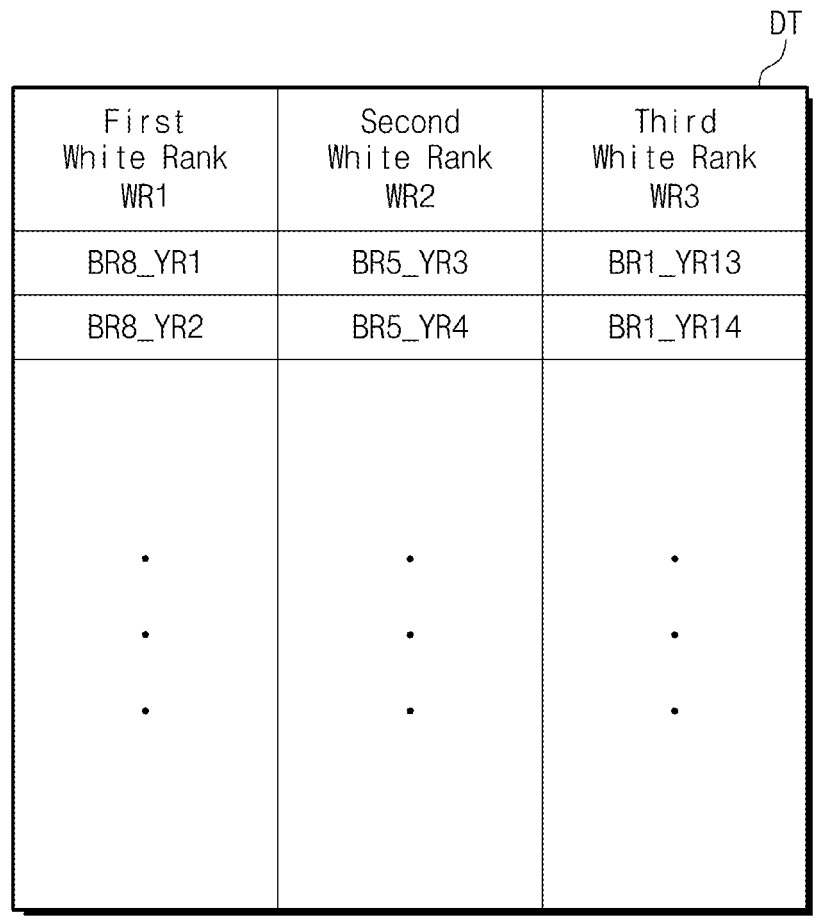
FIG. 14 is a view showing a classification table according to an exemplary embodiment of the present disclosure.

FIG. 14 is a view showing a classification table DT according to an exemplary embodiment of the present disclosure.

Then, the light source units are classified into the white ranks according to the color coordinates (S5) as shown in the classification table of FIG. 14. For instance, the light sources units are classified into the first to third white ranks WR1 to WR3 as described with reference to FIG. 3. In other words, each of the light source units is classified to one of the first to third white ranks WR1 to WR3 in accordance with the white color coordinate area to which the white color coordinate of each of the light source units belongs. In more detail, columns of the classification table DT respectively correspond to the first to third white ranks WR1 to WR3. The light source units classified into the first to third white ranks WR1 to WR3 belong to the first to third columns, respectively.

For instance, since the white color coordinate (Cx=0.293, Cy=0.031) of the light source unit BR8_YR2 corresponding to the combination of the eighth blue rank BR8 and the second yellow rank YR2 belongs to the first white color coordinate area WCA1, the light source unit BR8_YR2 is classified to the second white rank WR2.

Similarly, since the white color coordinate (Cx=0.311, Cy=0.34) of the light source unit BR1_YR14 corresponding to the combination of the first blue rank BR1 and the fourteenth yellow rank YR14 belongs to the first white color coordinate area WCA1, the light source unit BR1_YR14 is classified to the third white rank WR3.

Then, the light source units are arranged on the light source driving substrate 111 such that the light source units belonging to different white ranks are alternately arranged with each other on the light source driving substrate 111.

Figure 15:
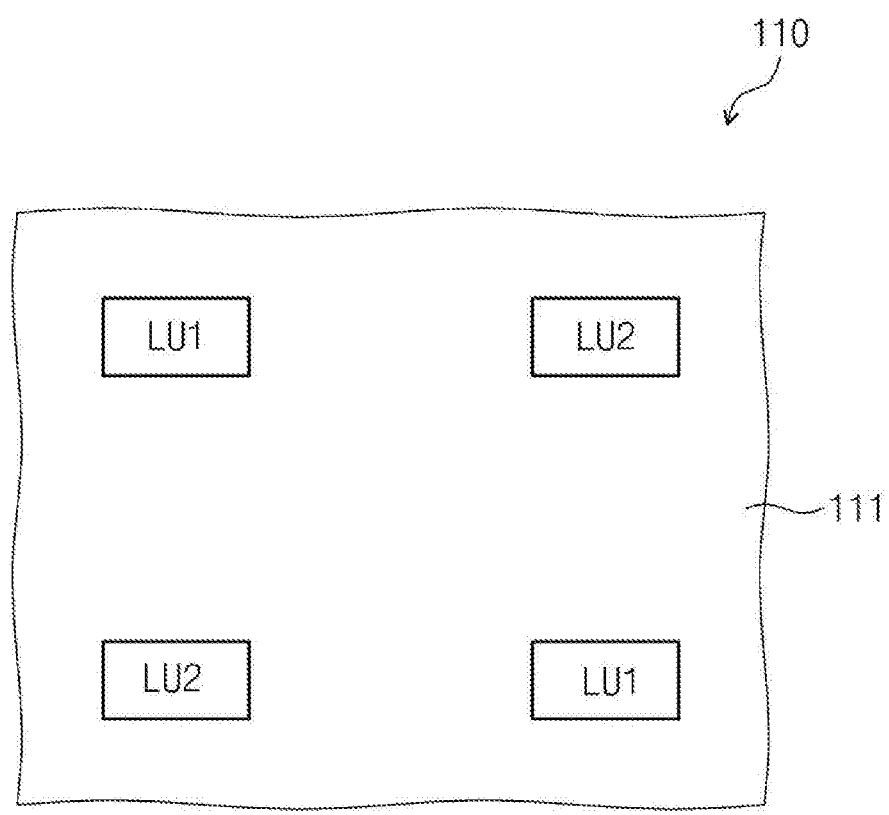
FIG. 15 is a view showing an arrangement of light source units according to an exemplary embodiment of the present disclosure.
Figure 16:
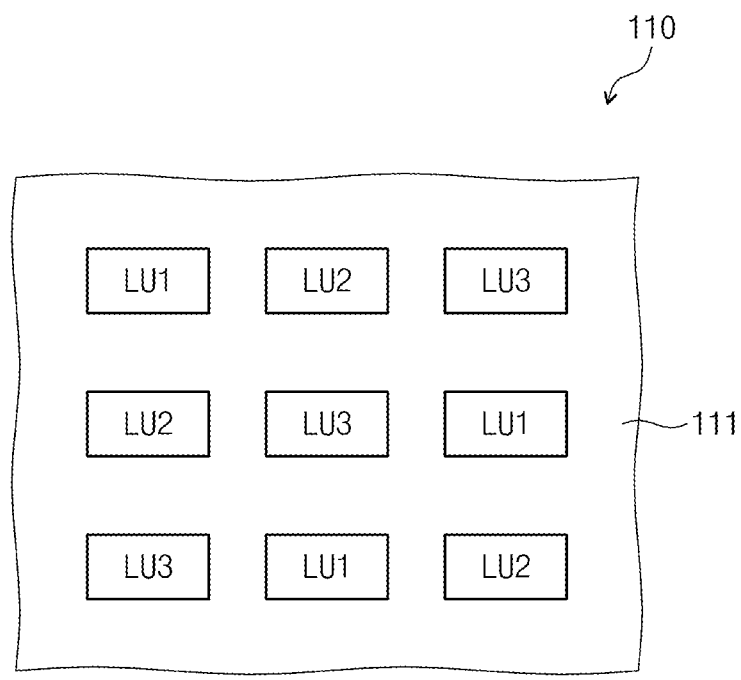
FIG. 16 is a view showing an arrangement of light source units according to another exemplary embodiment of the present disclosure.

FIG. 15 is a view showing an arrangement of light source units according to an exemplary embodiment of the present disclosure and FIG. 16 is a view showing an arrangement of light source units according to another exemplary embodiment of the present disclosure.

Referring to FIGS. 14 and 15, the first light source unit LU1 and the second light source unit LU2 are alternately arranged in the matrix form on the light source driving substrate 111. As an example, the first light source unit LU1 is selected from the light source units belonging to the first white rank WR1 and the second light source unit LU2 is selected from the light source units belonging to the second white rank WR2.

In more detail, the first and second light source units LU1 and LU2 are alternately arranged in the row and column directions. Therefore, the first light source units LU1 are arranged not to be adjacent to each other in the row and column directions and the second light source units LU2 are arranged not to be adjacent to each other in the row and column directions.

However, the arrangement of the light source units should not be limited thereto or thereby. As shown in FIG. 16, the first, second, and third light source units LU1, LU2, and LU3 are alternately arranged in the matrix form on the light source driving substrate 111. In the present exemplary embodiment, the third light source unit LU3 is selected from the light source units belonging to the second white rank WR2.

In more detail, the first, second, and third light source units LU1, LU2, and LU3 are alternately arranged in the row and column directions. Accordingly, the first light source units LU1 are arranged not to be adjacent to each other in the row and column directions, the second light source units LU2 are arranged not to be adjacent to each other in the row and column directions, and the third light source units LU3 are arranged not to be adjacent to each other in the row and column directions.

However, the arrangement of the first, second, and third light source units LU1, LU2, and LU3 should not be limited thereto or thereby. That is, the first, second, and third light source units LU1, LU2, and LU3 may be arranged in various ways unless the difference in the white color coordinate between the first, second, and third light source units LU1, LU2, and LU3 are perceived by the user. For instance, the first to third light source units LU1 to LU3 may be repeatedly arranged in order of "LU1/LU2/LU3/LU2" or "LU1/LU3/LU2/LU2/LU3/LU1" in the row and/or column directions.

In addition, a ratio of combination between the first, second, and third light source units LU1, LU2, and LU3 may be determined by the yield of the first, second, and third light source units LU1, LU2, and LU3.

As described above, when the light source units are classified in accordance with the luminous intensity and brightness of the blue and yellow light emitting units and alternately arranged with each other on the light source driving substrate 111, the blue and yellow light emitting diodes belonging to various ranks may be used. Therefore, the yield of the light source units and the backlight unit including the light source units is improved, and as a result, the manufacturing cost of the backlight unit is reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight unit, comprising:
a light source driving substrate;
a first light source unit connected to the light source driving substrate; and
a second light source unit connected to the light source driving substrate, wherein the first light source unit comprises a first light source emitting a first light having a first color and a second light source emitting a second light having a second color, the second light source unit comprises a third light source emitting a third light having the first color and a fourth light source emitting a fourth light having the second color, the first light source unit emits a first white color light having a first white color coordinate, which is obtained by mixing the first light and the second light, the second light source unit emits a second white color light having a second white color coordinate, which is obtained by mixing the third light and the fourth light, the first and second white color coordinates belong to different white color coordinate areas, wherein a color coordinate area of the first color is defined in an area on a CIE color coordinate system corresponding to the first color and classified into a plurality of first color coordinate ranks, a color luminous intensity of the first color is classified into a plurality of first color luminous intensity ranks, and the first and the third light sources belong to different first color ranks among a plurality of first color ranks classified in accordance with the first color coordinate ranks and the first color luminous intensity ranks.

2. The backlight unit of claim 1, wherein a color coordinate area of the second color is defined in an area on the CIE color coordinate system corresponding to the second color and classified into a plurality of second color coordinate ranks, a color luminous intensity of the second color is classified into a plurality of second color luminous intensity ranks, and the second and the fourth light sources belong to different second color ranks among a plurality of second color ranks classified in accordance with the second color coordinate ranks and the second color luminous intensity ranks.

3. The backlight unit of claim 1, wherein the first and second light source units are alternately arranged with each other.

4. The backlight unit of claim 1, further comprising a third light source unit connected to the light source driving substrate, wherein the third light source unit comprises a fifth light source emitting a fifth light having the first color and a sixth light source emitting a sixth light having the second color, the third light source unit emits a third white color light having a third white color coordinate, which is obtained by mixing the fifth and sixth lights, and the first, second, and third white color coordinates belong to different color coordinate areas.

5. The backlight unit of claim 4, wherein the third white color coordinate belongs to substantially the same color coordinate as an average color coordinate of the first and second white color coordinates.

6. A display device, comprising:
a display panel displaying an image; and
a backlight unit providing a light to the display panel, the backlight unit comprising:
a light source driving substrate;
a first light source unit connected to the light source driving substrate; and
a second light source unit connected to the light source driving substrate, wherein the first light source unit comprises a first light source emitting a first light having a first color and a second light source emitting a second light having a second color, the second light source unit comprises a third light source emitting a third light having the first color and a fourth light source emitting a fourth light having the second color, the first light source unit emits a first white color light having a first white color coordinate, which is obtained by mixing the first light and the second light, the second light source unit emits a second white color light having a second white color coordinate, which is obtained by mixing the third light and the fourth light, the first and second white color coordinates belong to different color coordinate areas, wherein the first color is a yellow color and the second color is a blue color, and wherein the backlight unit is operated in the time division scheme in synchronization with a first field and a second field, which are obtained by timely dividing a frame, the first and third light sources respectively emit the first and third lights during the first field, and the second and fourth light sources respectively emit the second and fourth lights during the second field.

7. The display device of claim 6, wherein the display panel comprises a first pixel comprising a first color filter having a third color, a second pixel comprising a second color filter having a fourth color, and a third pixel comprising a transmission part.

8. The display device of claim 7, wherein the first color is obtained by mixing the third and fourth colors.

9. A method of manufacturing a backlight unit, comprising:
providing a plurality of first color light sources and a plurality of second color light sources;
classifying the first color light sources into a plurality of first color ranks classified in accordance with a plurality of first color coordinate ranks and a plurality of first color luminous intensity ranks;
classifying the second color light sources to a plurality of second color ranks classified in accordance with a plurality of second color coordinate ranks and a plurality of second color luminous intensity ranks;
combining the first color light sources emitting a light having a first color with the second color light sources emitting a light having a second color according to a combination of the first and the second color ranks to form a plurality of light source units;
determining a color coordinate of the light source units;
classifying the light source units into at least two white ranks in accordance with the color coordinate of each of the light source units; and
arranging the light source units on a light source driving substrate to allow the light source units belonging to different white ranks to be alternately arranged with each other, wherein a color coordinate area of the first color is defined in an area on a CIE color coordinate system corresponding to the first color and classified into the first color coordinate ranks, a color luminous intensity of the first color is classified into the first color luminous intensity ranks, and a color coordinate area of the second color is defined in an area on the CIE color coordinate system corresponding to the second color and classified into the second color coordinate ranks, a color luminous intensity of the second color is classified into the second color luminous intensity ranks.

10. The method of claim 9, wherein the color coordinate of the light source units is determined with reference to a combination table, and the combination table comprises information about white color coordinates according to the combination of the first color ranks and the second color ranks.

11. The method of claim 10, wherein the color coordinate of the light source units is determined by comparing information about the first and the second color ranks of the first and second color light sources, which respectively belong to the light source units, with the combination table.

12. The method of claim 9, wherein the at least two white ranks comprise a first white rank and a second white rank, first light source units belonging to the first white rank among the light source units emit a first white color light having a first white color coordinate, second light source units belonging to the second white rank among the light source units emit a second white color light having a second white color coordinate, and the first and second white color coordinates belong to different color coordinate areas.

13. The method of claim 12, wherein the two white ranks further comprise a third white rank, third light source units belonging to the third white rank among the light source units emit a third white color light having a third white color coordinate, and the third white color coordinate belongs to a color coordinate area different from the first and second white color coordinates.

14. The method of claim 13, wherein the third color coordinate belongs to substantially the same color coordinate area as an average color coordinate of the first and second white color coordinates.

15. The method of claim 14, wherein the first, second, and third light source units are alternately arranged with each other.

16. The backlight unit of claim 3, wherein the first light source is spaced apart from the second light source by a first distance, the third light source is spaced apart from the fourth light source by the first distance, the first light source unit is spaced apart from the second light source unit in the row direction by a second distance, the second light source unit is spaced apart from the first light source unit in the column direction by a third distance, the first distance is set to be smaller than each of the second and third distances.

17. The backlight unit of claim 1, wherein a number of light sources arranged within the second light source unit is equal to a number of light sources arranged within the first light source unit.

18. The method of claim 12, wherein a number of light sources arranged within the second light source unit is equal to a number of light sources arranged within the first light source unit.

19. The backlight of claim 1, wherein a difference in color coordinate of the first light source and the third light source amounting to no more than a variation in Cy of 0.05 and a variation in Cx of 0.03 in the CIE color coordinate system.

* * * * *